(12) United States Patent
Ferrera et al.

(10) Patent No.: US 10,760,724 B2
(45) Date of Patent: Sep. 1, 2020

(54) FEMALE QUICK COUPLING AND QUICK CONNECTOR COMPRISING SAID FEMALE QUICK COUPLING

(71) Applicant: Faster S.R.L., Rivolta d'Adda (IT)

(72) Inventors: Rocco Ferrera, Rivolta d'Adda (IT); Roberto Sorbi, Rivolta d'Adda (IT); Paolo Rusconi, Rivolta d'Adda (IT)

(73) Assignee: FASTER S.R.L., Rivolta d'Adda (IT)

( * ) Notice: Subject to any disclaimer, the term of this patent is extended or adjusted under 35 U.S.C. 154(b) by 0 days.

(21) Appl. No.: 16/319,233

(22) PCT Filed: Jul. 29, 2016

(86) PCT No.: PCT/IB2016/054556
§ 371 (c)(1),
(2) Date: Jan. 18, 2019

(87) PCT Pub. No.: WO2018/020298
PCT Pub. Date: Feb. 1, 2018

(65) Prior Publication Data
US 2019/0249809 A1 Aug. 15, 2019

(51) Int. Cl.
*F16L 37/36* (2006.01)
*F16L 37/23* (2006.01)

(52) U.S. Cl.
CPC .............. *F16L 37/36* (2013.01); *F16L 37/23* (2013.01)

(58) Field of Classification Search
CPC .................................. F16L 37/36; F16L 37/23
USPC ........................................ 137/614.03–614.06
See application file for complete search history.

(56) References Cited

U.S. PATENT DOCUMENTS

| 7,819,135 B2 * | 10/2010 | Aragones et al. ...... F16L 37/32 |
| | | 137/614.04 |
| 2004/0074541 A1 | 4/2004 | Sharpe |
| 2018/0045350 A1 * | 2/2018 | Van Der Heijden et al. ............... |
| | | B67D 1/0832 |

FOREIGN PATENT DOCUMENTS

| EP | 1346946 | 9/2003 |
| GB | 2250073 | 5/1992 |
| WO | 2014080242 | 5/2014 |

* cited by examiner

*Primary Examiner* — Kevin L Lee
(74) *Attorney, Agent, or Firm* — Stetina Brunda Garred and Brucker

(57) ABSTRACT

The present invention relates to a female coupling and the respective female-male connector, the female coupling being adapted to be connected to and disconnected from a corresponding male coupling by means of pushing and pulling actions, respectively, said female coupling and male couplings comprising a female valve assembly and a male valve assembly respectively, each of said female and male valve assemblies being adapted to be alternatively translated forwards and backwards between a first closing position and a second opening position, wherein the flow of a fluid is possible between the female coupling and male coupling with said female and male valve assemblies in the respective opening positions, wherein said female coupling comprises mechanical locking means adapted to prevent the accidental switching of said female valve assembly from its said second opening position to its first closing position even in case of fluid flow from the male connector to the female connector.

14 Claims, 5 Drawing Sheets

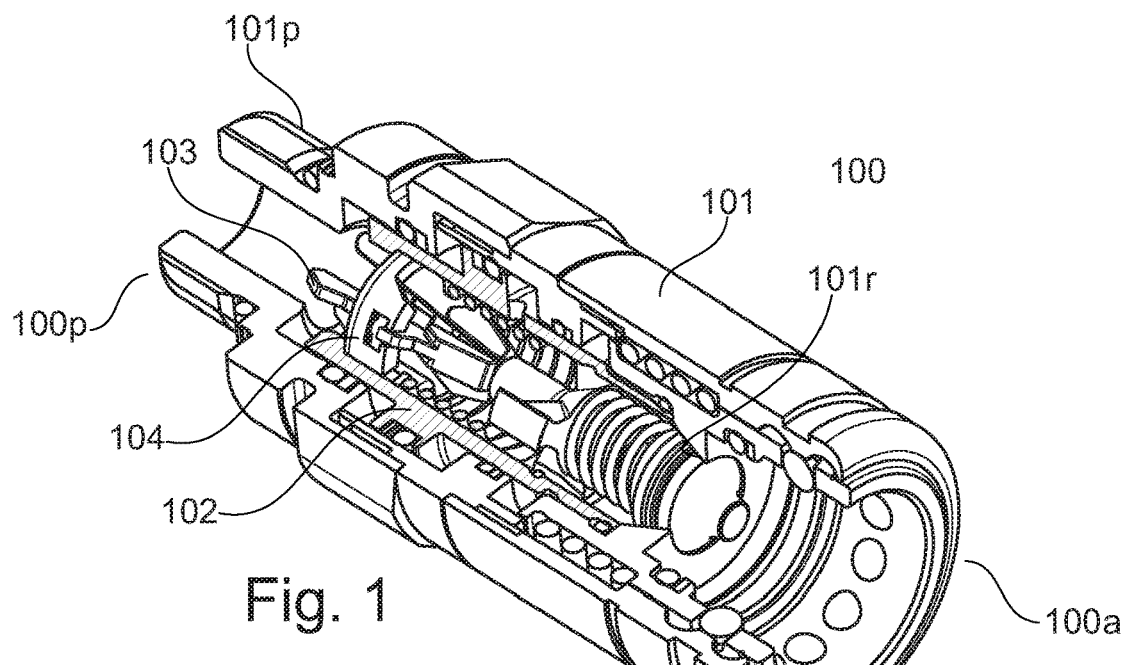
Fig. 1
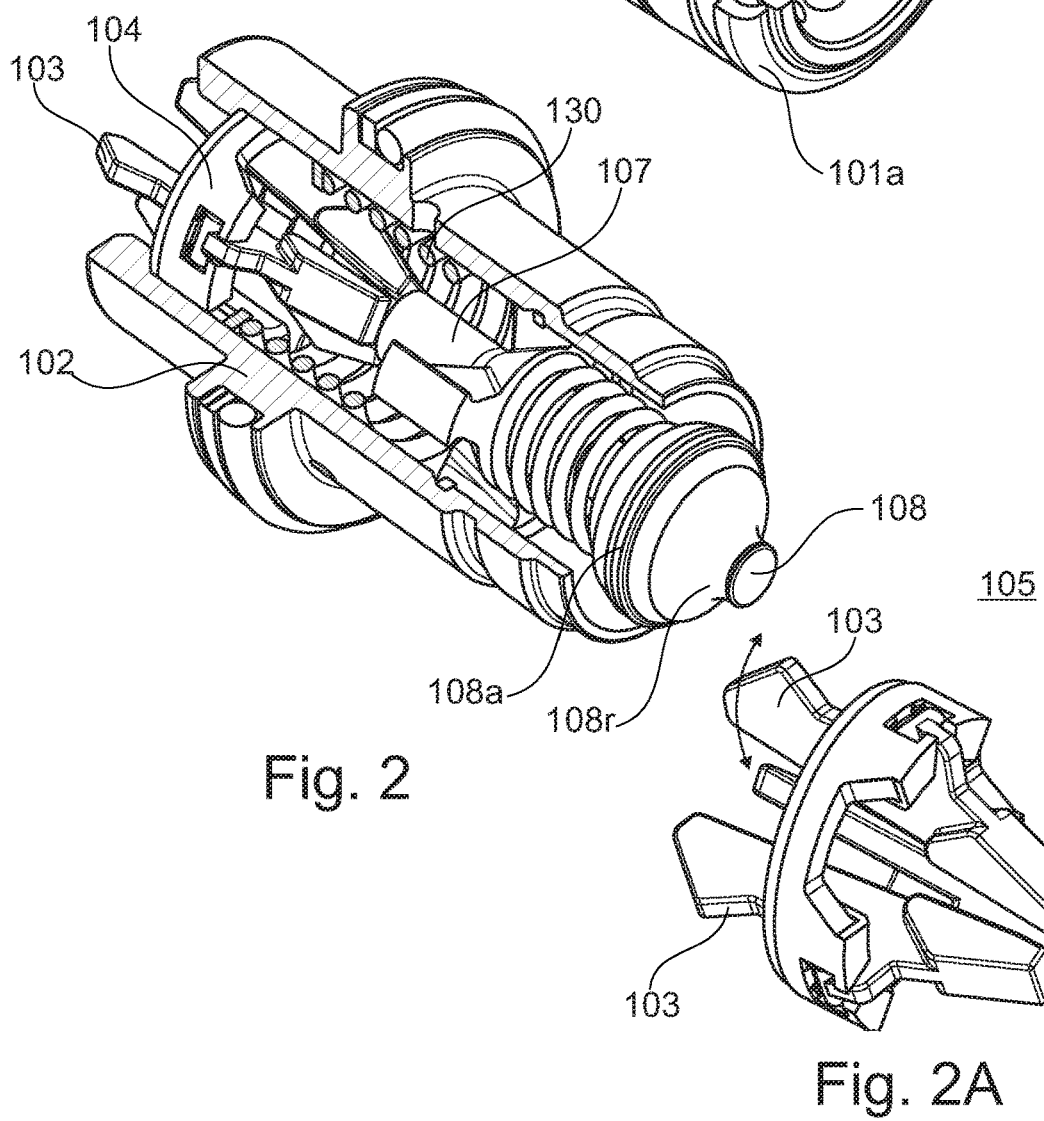
Fig. 2
Fig. 2A

FEMALE QUICK COUPLING AND QUICK CONNECTOR COMPRISING SAID FEMALE QUICK COUPLING

CROSS REFERENCE TO RELATED APPLICATION(S)

The present application claims priority to PCT International Application No. PCT/IB2016/054556 filed on Jul. 29, 2016, the entirety of the disclosures of which are expressly incorporated herein by reference.

STATEMENT RE: FEDERALLY SPONSORED RESEARCH/DEVELOPMENT

Not Applicable.

TECHNICAL FIELD

The present invention relates to a quick connector for hydrodynamic applications, in particular for hydraulic circuits or the like, comprising a female coupling and a male coupling. In particular, the present invention relates to a quick connector of the push-pull type, in which the female and male couplings are shaped so as to be able to be reciprocally connected and disconnected by means of pushing and pulling actions, respectively. In detail, the present invention relates to a quick connector of the aforesaid type adapted to be used in the agricultural sector, in particular for use on agricultural machinery in which the respective connection of the hydraulic circuits of a main tractor and of the machinery or implement employed or used each time is envisaged. Even more in detail, the present invention relates to a female coupling for a connector of the aforesaid type, and in particular to an innovative solution for automatically locking the valve assembly of said female coupling in opening position.

PRIOR ART

Quick connectors for reciprocally connecting hydraulic circuits by means of flexible pipes are known in prior art. For example, quick connectors of the push-pull type are known for reciprocally connecting the hydraulic circuits of a main tractor and of an implement, respectively, wherein the connection and the disconnection of the female and male couplings is obtained by means of pushing and pulling actions, respectively. Furthermore, the female and male couplings of the quick connectors of the push-pull type are shaped so that the mechanical connection (by pushing, usually on the male coupling) of the female and male couplings causes the automatic positioning of the respective valve assemblies in the opening position (and thus the hydraulic connection, so that the fluid flow between the two female and male connectors is possible), while the disconnection (by pulling, usually on the male coupling) of the female and male couplings results in the automatic repositioning of the female and male valve assemblies in the respective closing positions (in which the hydraulic circuits are closed and separated and the fluid flow between the two female and male connectors is not possible).

The risk of accidental movement or displacement of the female valve assembly from the opening position, in particular in the case of push-pull connectors, (even in the coupling or reciprocal connection condition of the male and female couplings) is well known, e.g. as a consequence of the fluid flow inversion, where the accidental displacement of the female valve assembly results into a displacement of the male valve assembly from the opening position to the closing position, with the resulting discontinuity between the two hydraulic circuits (connected to the female coupling and to the male coupling, respectively), which obviously, in turn, causes an interruption of the fluid flow, wherein the equipment or tool is consequently no longer hydraulically assisted by the hydraulic circuit of the main operating machine.

Different are the solutions suggested in the prior art for overcoming or at least minimizing the risk of accidental movement of the female valve assembly and thus of accidental closing of the male valve assembly. For example, hydraulic type solutions are known, in which the female valve assembly is locked in the opening position by means of a secondary hydraulic circuit. However, said solutions of the hydraulic type are quite costly and complicated, and very often do not match with market needs, accordingly.

Mechanical type solutions were then suggested alternatively to the hydraulic type solutions, i.e. in which the locking of the female valve assembly in open position is obtained automatically by means of a mechanical device as a result of the reciprocal coupling of the male and female couplings. Said solutions of the mechanical type are also not free from drawbacks and/or contraindications.

In particular, the main drawback is related to the fact that, being the lock mechanism necessarily accommodated in the female coupling, the increased dimensions of the locking mechanism often causes an increase of the dimensions of the female coupling, which is however mostly unacceptable for the most common applications.

A further drawback relates to the structural complexity of the mechanical mechanism, which often includes a very high number of component parts, where the high number of components parts often inevitably causes an unacceptable increase of manufacturing costs, in particular of assembly costs, as well as a reduced reliability of the locking mechanism, with consequent increased need for maintenance operations.

DESCRIPTION OF THE PRESENT INVENTION

It is an object of the present invention to overcome or at least minimize the drawbacks affecting the solutions according to the prior art, in particular those related to the mechanical automatic locking device of the female valve assembly.

In particular, it is an object of the present invention to provide a solution related to a mechanical locking mechanism of the female valve assembly, characterized by a low number of component parts and limited dimension, which in particular allows it to be installed on the couplings of the known type, without increasing the overall dimension thereof.

It is a further object of the present invention to provide a mechanical type mechanism and/or device for automatically locking the female valve assembly in opening position, characterized by functional simplicity, and thus high and constant reliability over time, as well as limited wear.

It is a further object of the present invention to manufacture and suggest a mechanism of the aforesaid type which can be made according to simple and standardizable manufacturing methods which are and can be standardized and thus at low cost compatible with market needs.

The present invention is based on the general consideration according to which it is possible to achieve the above identified predetermined objects by appropriately exploiting the translation of the female valve assembly from the closing position to the opening position arising from the reciprocal connection of the female and male couplings (in practice of the male coupling in the female coupling) for switching the locking mechanism.

In view of both the objects summarized above and the drawbacks affecting the quick connectors according to the prior art, as well as of the considerations above, the present invention relates to a female coupling adapted to be connected to and disconnected from a corresponding male coupling (in particular, by means of pushing and pulling actions, respectively), said female and male couplings comprising a female valve assembly and a male valve assembly, respectively, each of said female and male valve assemblies being adapted to be alternatively translated forwards and backwards between a first closing position and a second opening position, wherein the fluid flow between the female coupling and male coupling is possible with said female and male valve assemblies in the respective opening positions, wherein said female coupling comprises mechanical locking means adapted to lock said female valve assembly in its opening position so as to prevent accidental displacements or translations of said female valve assembly from its second opening position even in case of fluid flow from the male coupling to the female coupling, wherein said mechanical locking means comprise a rocker arm adapted to oscillate between a first engaging position and a second releasing position, and wherein said rocker arm, in its first engaging position, engages said female valve assembly, thus locking it in its second opening position so as to prevent displacements and/or translations of said female valve assembly from its second opening position.

According to an embodiment, said female coupling comprises an outer hollow main assembly, and said rocker arm is adapted to be translated with respect to the outer hollow main assembly between a first front position and second rear position, where said rocker arm is adapted to be automatically switched from its first engaging position to its second releasing position as a result of its translation from its first front position towards its second rear position.

According to an embodiment, said female coupling further comprises an inner hollow assembly accommodated in said outer hollow main assembly and adapted to be alternatively translated forwards and backwards with respect to said outer hollow main assembly between a first front position and a second rear position, where said rocker arm is fixed to said hollow inner assembly so that said rocker arm is automatically switched from its first engaging position to its second releasing position following the translation of said inner hollow assembly from its first front position to its second rear position.

According to an embodiment, said mechanical locking means comprise a substantially ring-shaped intermediate element in said inner hollow assembly, where said rocker arm is fixed to said intermediate ring-shaped element.

According to an embodiment, said rocker arm comprises a front end portion and a second end portion opposite to said first front end portion, where said hollow outer main body comprises an engaging surface, and where said second end portion of said rocker arm and said engaging surface are reciprocally positioned and configured so as that, during the translation of said rocker arm from its first front position to its second rear position, said rocker arm is automatically switched from its first engaging position to its second releasing position as a result of the reciprocal engagement or contrast between said second end portion of said rocker arm and said engaging or contrasting surface of said hollow main body.

According to an embodiment, said engaging surface is truncated-conical.

According to an embodiment, said truncated-conical engaging surface is oriented so as to exert a thrust on said second end portion of said rocker arm such to move away said second end portion of said rocker arm from the inner surface of said outer hollow main body during the translation of said inner hollow body (and thus of said rocker arm) from its first front position towards its second rear position.

According to an embodiment, said female coupling further comprises elastic means configured so as to automatically switch said rocker arm from its second releasing position to its first engaging position during the translation of said rocker arm from its second rear position towards its first front position.

According to an embodiment, said elastic means comprise a helical spring interposed between said rocker arm and said female valve assembly.

According to an embodiment, said female coupling further comprises a ring-shaped spacer interposed between said elastic means and said rocker arm, where said ring-shaped spacer and said rocker arm are shaped and reciprocally positioned so that during the translation of said rocker arm from its second rear position towards its first front position said ring-shaped spacer is pushed against said rocker arm and said rocker arm is switched from its second releasing position to its first engaging position.

According to an embodiment, said rocker arm comprises an engaging or contrasting position, where said ring-shaped spacer and said engaging or contrasting surface are configured and reciprocally positioned so that, during the translation of said engaging arm from its second rear position towards its first front position, said ring-shaped spacer is pushed against said engaging or contrasting surface and said rocker arm is switched from its second engaging position to its first releasing position.

According to an embodiment, said rocker arm comprises a fixing pin by means of which said rocker arm is fixed to said hollow assembly, where said engaging or contrasting surface of said rocker arm is positioned between said fixing pin and said first outer portion of said rocker arm.

According to an embodiment, said female valve assembly comprises a main valve body and a valve guide, where said rocker arm, in its first engaging position, engages said female guide valve in its second opening position.

According to an embodiment, said female valve body and said female guide valve are adapted to be alternatively translated forwards and backwards with respect to each other.

It is a further object of the present invention a quick connector which comprises a female coupling according to the one of the embodiments above and a male coupling adapted to be coupled to and uncoupled from said female coupling.

Further possible embodiments of the present invention are defined in the claims.

BRIEF DESCRIPTION OF THE DRAWINGS

Hereinafter, the present invention will be explained by means of the following detailed description of the embodiments depicted in the drawings. However, the present invention is not limited to the embodiments described hereinafter and depicted in the drawings; conversely, all the variants of the embodiments described below and depicted in the drawings which will be apparent to those skilled in the art fall within the scope of the invention.

In the drawings:

FIG. 1 shows a perspective partial section view of a female coupling according to an embodiment of the present invention;

FIG. 2 shows a perspective partial section view of the main component parts of a female coupling according to an embodiment of the present invention;

FIG. 2a shows a perspective view of the automatic locking means according to an embodiment of the present invention;

DETAILED DESCRIPTION OF THE PRESENT INVENTION

Figure 3:
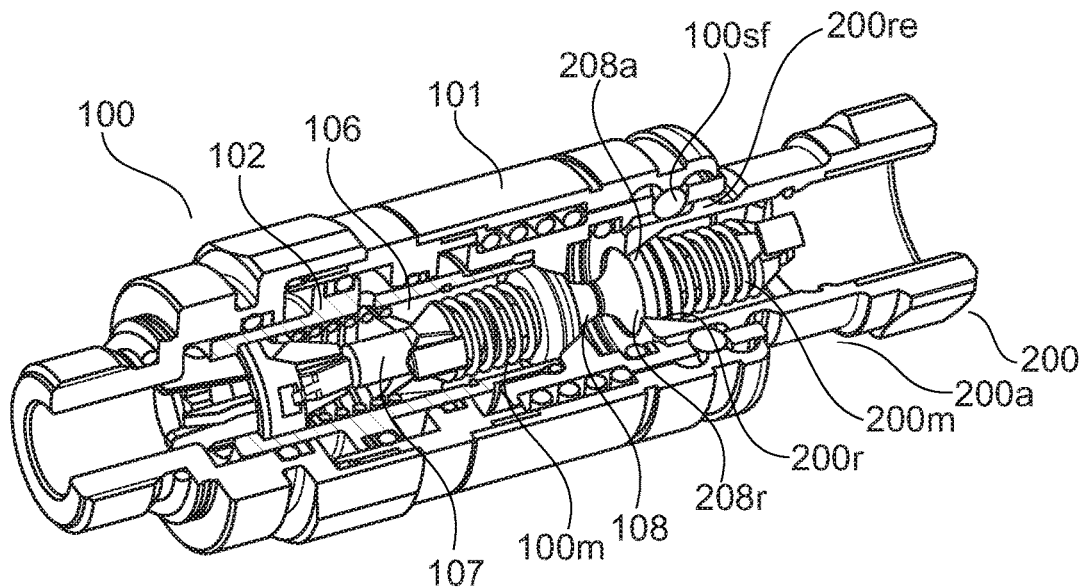
FIG. 3 shows a perspective partial section view of a female coupling according to an embodiment of the present invention and of a male coupling during a first step of reciprocal pre-connection.

In FIG. 1, the female element according to the embodiment of the present invention depicted therein is identified by reference numeral 100 and comprises an outer hollow main assembly or body 101 and an inner hollow secondary assembly or body 102 accommodated in the hollow main assembly 101. The hollow main body 101, in turn, consists of a plurality of hollow cylindrical bodies connected to one another to form the main assembly 101 according to substantially known methods and therefore not described in detail for the sake of brevity. Similarly, the secondary hollow assembly 102 also consists of a plurality of cylindrical bodies reciprocally assembled and connected to form the secondary assembly 102, also in this case according to methods substantially known in themselves. The secondary hollow assembly 102 (a single hollow cylindrical body of which is shown in FIG. 2) is adapted to be translated within the assembly 101 alternatively forwards and backwards (i.e. from the left rightwards and from the right leftwards with respect to FIG. 1), wherein the translation of the secondary hollow assembly 102 with respect to the hollow main assembly 101 allows to connect and disconnect the female coupling 100 to and from a male element, according to the methods summarized briefly below. As will be more clearly apparent from the following detailed description, according to the present invention, the forward and backward translation of the secondary hollow body 102 in the two translation senses is exploited for automatically switching the locking mechanism of the valve assembly of the female coupling 100 in its opening position. Hereinafter in the present description, for the sake of clarity, the valve assemblies of the female coupling or element 100 and of the male coupling or element 200 (also see FIG. 3) will be referred to as female valve assembly and male valve assembly, respectively.

Furthermore, and again for the sake of clarity of explanation, a front end portion and a rear end portion will be identified for each of the female couplings or elements 100 and the male couplings or elements 200, wherein "front end portions" of the female element or coupling 100 and of the male element or coupling 200, respectively, are the end portions intended to be reciprocally engaged by reciprocally connecting or coupling the female coupling 100 and the male coupling 200, and wherein, conversely, "rear end portions" of the female coupling 100 and of the male coupling 200, respectively, are meant the end portions opposite to the respective front end portions. With reference to the figures, the front end portion of the female coupling 100 is identified by reference numeral 100a and is adapted to be engaged by the front end portion 200a of the male coupling 200. The rear end portions 100p and 200p are instead intended to be each connected, e.g. to a pipe of a corresponding hydraulic circuit, according to methods substantially known in themselves and thus not described in detail.

Coherently, hereinafter in the present description, with regards to component parts, definitions such as for example "front" and/or "rear" will be used depending on the position or location of said component parts with respect to the front and/or rear ends (end portions) of the female coupling 100 and male coupling 200. Again by way of example, as to the hollow main assembly 101, a front end portion 101a (either close to or facing the end portion 100a of the female element 100) and a rear end portion 101p, opposite to the front end portion 101a (and thus either close to or facing the rear end portion 100p of the female element or coupling 100) are identified.

The female valve assembly is identified in the drawings by reference numeral 106 and substantially comprises a rear guiding element 107 (also named hereinafter valve guide) and a front valve body 108 proper (also simply named valve). The front end portion 108a of the valve body or valve 108 comprises a tapered or truncated-conical surface 108r intended to engage a corresponding tapered or truncated-conical surface 101r of the hollow main assembly 101 with the valve assembly 106 in the closing position, wherein the reciprocal engagement of the tapered surfaces 108r and 101r closes the inner conduit of the female element or coupling 100 (the inner conduit being defined in cooperation by the outer main assembly 101 and by the inner secondary assembly 102), thus preventing the fluid flow through the female element or coupling 100 in this manner Equivalently, the reciprocal distancing (according to methods described more in detail below) of the tapered or truncated-conical surfaces 108r and 101r, in particular the retraction of the valve body 108), causes the opening of the conduit, thus rendering the fluid flow possible through the female element 100.

The same applies to the male element or coupling 200, which substantially comprises a valve body 208 proper. The front end portion 208a of the valve body or valve 208 comprises a tapered or truncated-conical surface 208r intended to engage a corresponding tapered or truncated-conical surface 200r of the male coupling 200 with the valve body assembly 208 in the closing position, wherein the reciprocal engagement of the tapered surfaces 208r and 200r closes the inner conduit of the male element or engagement 200, thus preventing the fluid flow through the male element or coupling 200. Equivalently, the reciprocal distancing (according to methods described more in detail below) of the tapered or truncated-conical surfaces 208r and 200r (the retraction of the valve body 208) causes the opening of the conduit, thus making the fluid flow possible through the male element 200.

Figure 4:
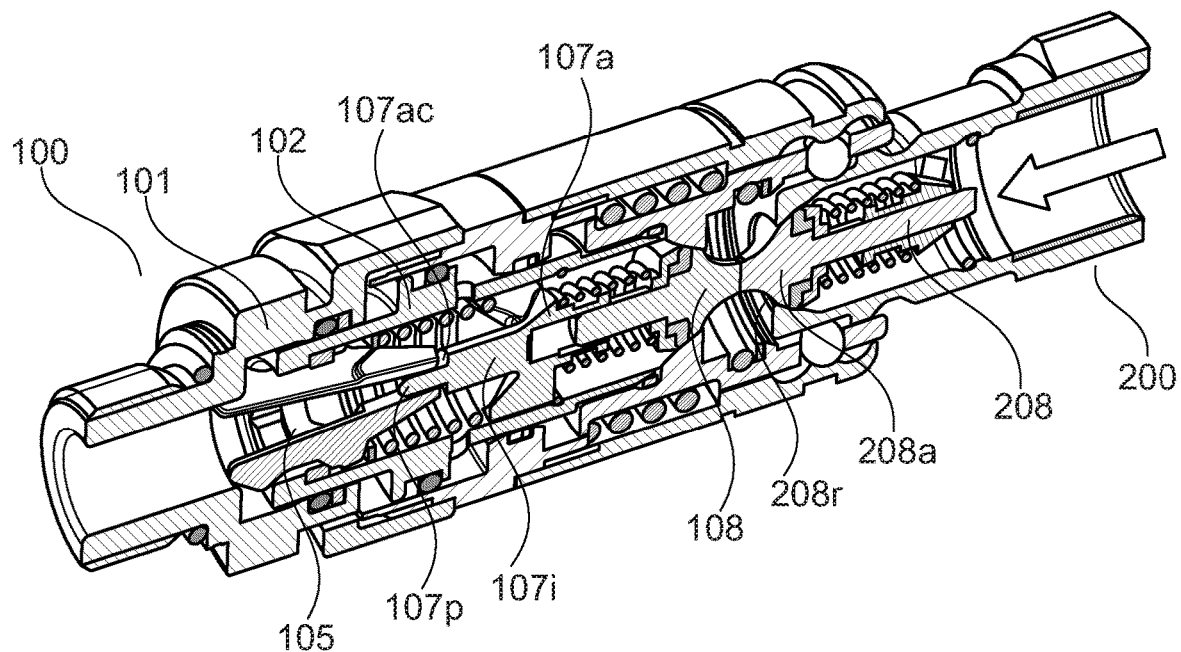
FIG. 4 shows a perspective and partial section view of a female coupling according to an embodiment of the present invention and of a male coupling during a second step of reciprocal pre-connection.
Figure 6:
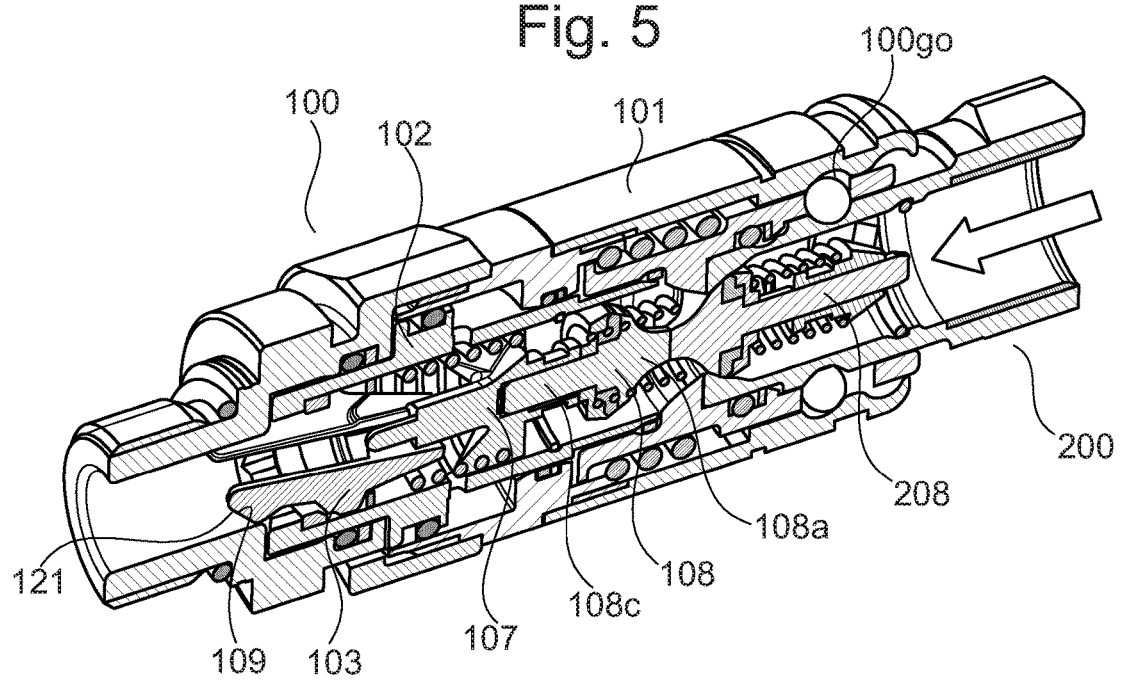
FIG. 6 shows a perspective and partial section view of a female coupling according to an embodiment of the present invention and of a male coupling during a further intermediate step of reciprocal connection.

The shape of the valve body 108 and of the valve guide 107 of the female valve assembly 106 can be observed in FIGS. 4 and 6.

The valve body 108 comprises a substantially cylindrical rear shank 108c which extends backwards from the front end portion 108a; the valve guide 107 comprises a front hollow end portion 107a, wherein the shank 108c is accommodated. Furthermore, the valve guide 107 comprises an intermediate portion 107i, from which a rear end portion 107p, also substantially cylindrical, but also of smaller radius than the radius of the intermediate portion 107i, extends backwards. The intermediate portion 107i and the rear portion 107p are thus reciprocally joined by a ring-shaped abutting surface 107ac, which is substantially perpendicular to the longitudinal symmetry axis of the valve guide 107, coinciding in turn with the longitudinal symmetry axis of the female coupling 100, and thus with each of those of the outer main assembly 101 and inner secondary assembly 102.

The valve body 108 and the valve guide 107 can be translated forwards and backwards in the two senses of translation with respect to the secondary hollow body 102; furthermore, the valve body 108 and the valve guide 107 can be translated with respect to each other, wherein the portion of the shank 108c actually accommodated in the housing of the hollow accommodation housing of the valve guide 107 can thus be varied.

In retracted position with respect to the valve guide 107, locking means 105, provided for the automatic locking of the female valve assembly 106 in the opening position are accommodated in the hollow secondary assembly 102 (see the description below).

The means 105 (FIG. 2A) comprise, in particular, an annular metal ring 104 rigidly fixed inside the inner secondary assembly 102; furthermore, the means 105 comprise a plurality of pivoting elements or arms 103, each of said pivoting elements 103 being fixed to the metal ring 104, so as to be able to pivot as indicated by the arrows in FIG. 2A, i.e. each on a plane on which the longitudinal axis of symmetry of the secondary inner assembly 102 lies.

Figure 9:
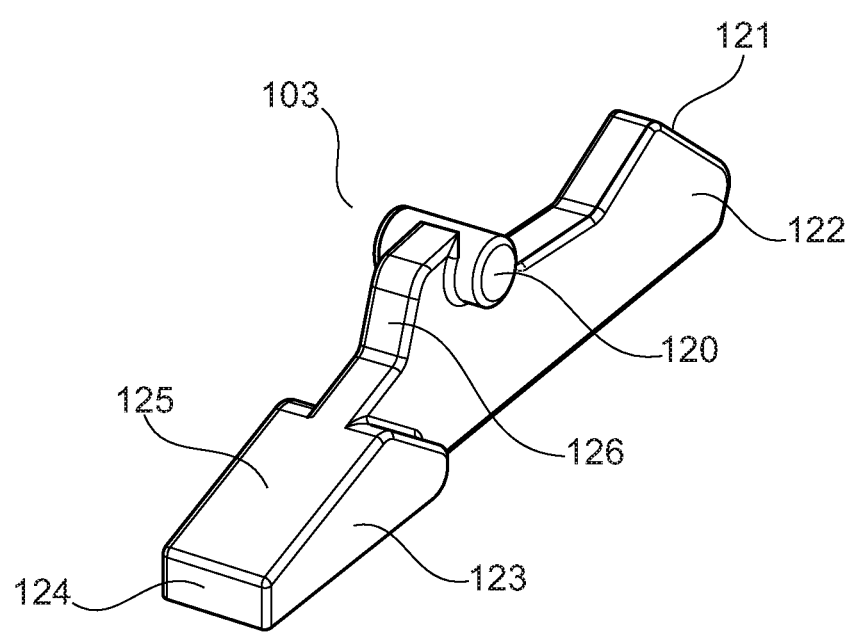
FIG. 9 shows a perspective view of a component part of the locking means according to an embodiment of the present invention.

As depicted in particular in FIG. 9, each of the pivoting elements 103 comprises a first front end portion 123 and a second rear end portion 122 opposite to the first front end portion 123 and a connecting and/or fixing pin 120, in intermediate position between the front end 123 and the rear end 122, by means of which the pivoting element or arm 103 is rotationally fixed to the metal ring 104, wherein the longitudinal axis of symmetry of the pin 120 corresponds to the rotation axis of the arm 103, and thus lies on a plane perpendicular to the longitudinal symmetry axis of the inner hollow assembly 102.

The front end 123 of the arm 103 comprises, in turn, a front engaging or abutting surface 124 from which an inclined surface 125 extends, wherein a further inclined surface 126 extends from the surface 125, the inclination of the surface 126 being different from the inclination of the surface 125 with respect to any common reference plane.

The second rear end portion 122 comprises an inclined switching portion 121.

Thus, it can be inferred from the above that, being each of the arms 103 fixed to the metal ring 104 in pivoting manner, each of the arms 103 can be switched between an engaging position, in which the surface 124 engages the connecting and engaging surface 107ac of the valve guide 107, and a releasing position, in which the surface 107ac is not engaged by the arms 103, so that therefore, being any translation of the arms 103 with respect to the inner assembly 102 along a direction parallel to the longitudinal symmetry axis of the inner assembly 102 prevented by the fixing metal ring 104, the reciprocal engagement of the arms 103 and of the surface 107ac prevents any backward translation of the valve guide 107 (against the arms 103), and thus ultimately of the valve body 108 and/or of the female valve assembly 106, which thus remains locked in the opening position.

The operating modes of the female coupling 100 according to the present invention, and in particular the operating modes of the automatic locking means 105 are described in detail below.

FIGS. 3 and 4 show the reciprocal positioning of the male element 200 and of the female element 100 during the step immediately before the reciprocal connection or coupling itself (both hydraulic and mechanical) of the male coupling 200 and the female coupling 100; in this step, the front end portion 200a of the male coupling 200 is at least partially accommodated within the front end portion 100a of the female coupling 100 and the valves 108 and 208, of the female coupling 100 and of the male coupling 200, respectively, are in reciprocal contact. The valve 208 of the male coupling 200 is maintained in closing position by the pressurized fluid (residual pressure) in the circuit downstream of the male coupling 200 (according to substantially known methods), wherein the valve 108 of the female coupling 100 is maintained in the closing position by the helical spring 100m (also in this case according to substantially known manners). It can be noted, in this step, that the outer ribbing 200re of the male coupling 200 is not yet in contact with (does not yet engage) the connecting balls 100sf accommodated in the front cylindrical body of the inner hollow assembly 102.

Figure 5:
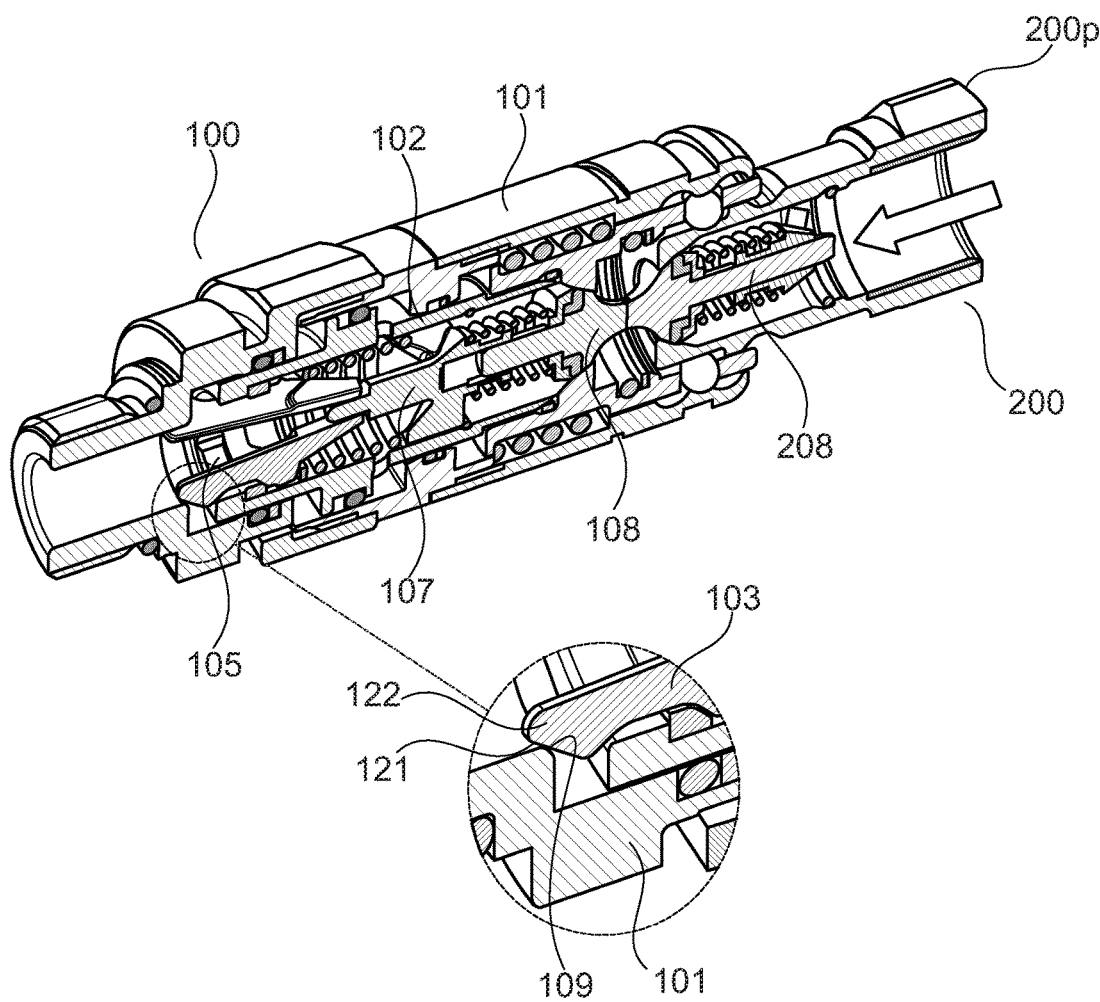
FIG. 5 shows a perspective and partial section view of a female coupling according to an embodiment of the present invention and of a male coupling during a further intermediate step of reciprocal connection.

During the subsequent step (FIGS. 5 and 5A), the further insertion of the male coupling 200 into the female coupling 100 causes a thrust exerted by the valve 208 on the valve 108 which is thus retracted from the opening position (first detachment of the tapered surface 108r from the tapered surface 101r), wherein the shank 108c penetrates into the hollow accommodation housing 107a of the valve guide 107; it is known that, during this step, the valve guide 107 is not translated backwards but remains in the starting position, being locked in said starting position by the locking means 105 (the surfaces 124 of the arms 103 engage the surface 107ac of the valve guide 107, wherein the opposite surfaces 121 of the arms 103 engage the surface 109 of the outer hollow main assembly 101). Furthermore, during this step, the outer ribbing 200re of the male coupling 200 approaches the connecting balls 100sf.

During further insertion of the male coupling 200 into the female coupling 100 (FIG. 6), the outer ribbing 200re of the male coupling 200 comes into contact with the balls 100sf exerting a longitudinal thrust on them which causes a retraction of the inner hollow assembly 102 with respect to the outer hollow assembly 101 (being the balls 100sf locked with respect to the inner hollow assembly 102). Furthermore, again during this intermediate step, the inner hollow assembly 102, in its backward translation, also draws the valve guide 107 and the locking means 105 backwards, wherein the valve 108 is further retracted (further detached or distanced from the surface 108r of the surface 101r under the bias of the male valve 208); furthermore, the reciprocal position of valve 108 and valve guide 107 changes, thus gradually increasing the portion of the shank 108c accommodated in the hollow housing 107a of the valve guide 107. Finally, the drawing of the locking means 105 by the inner hollow assembly 102 causes a radial thrust exerted by the surface 109 on the surface 121 of the second end portion 122 of each of the pivoting arms 103.

The thrust on the surfaces 121 exerted by the surface 109 causes an automatic switching of the locking means 105, in particular of the pivoting arms 103, wherein the rear ends 122 of the arms 103 reciprocally approach each other (are switched towards the inside of the assembly 102), so that the front ends 123 of the arms 103 are released from the surface 107ac of the valve guide 107 (are switched towards the inner surface of the inner assembly 102); at this point, the valve guide 107 is free and is in fact fed backwards by the valve body 108, because the shank 108c in the meantime has reached the complete insertion configuration in the housing 107a of the valve guide (backward end of travel position of the valve 108 with respect to the valve guide 107).

Figure 7:
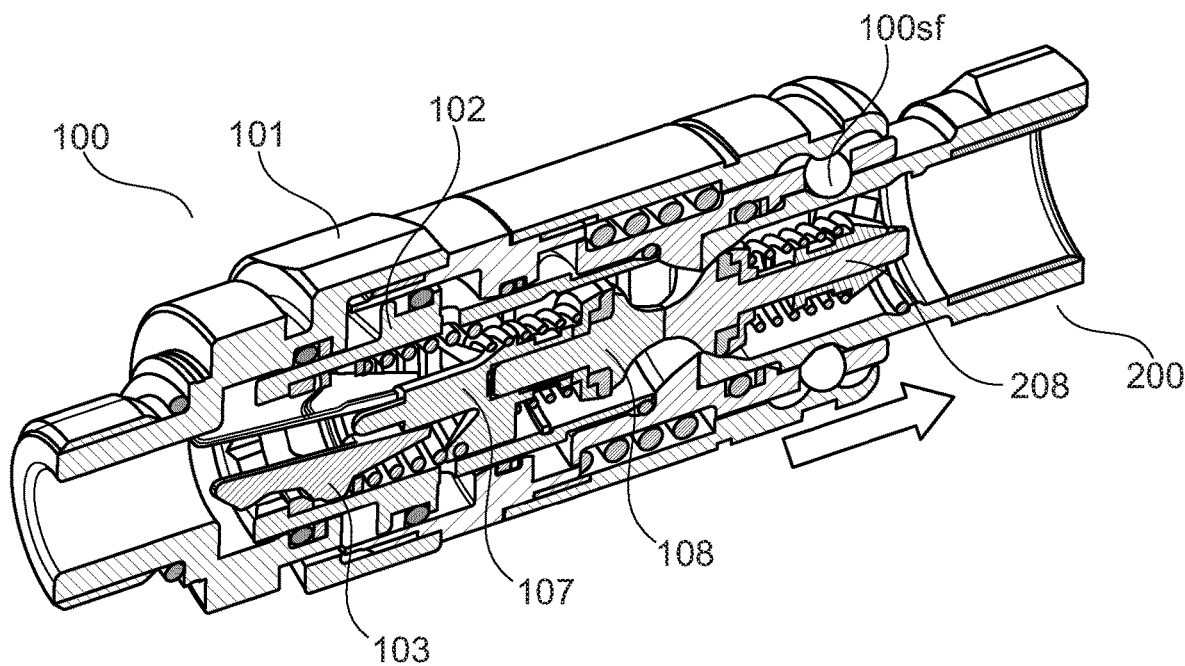
FIG. 7 shows a perspective and partial section view of a female coupling according to an embodiment of the present invention and of a male coupling during a further intermediate step of reciprocal connection.

The subsequent step of the reciprocal connection of the female coupling 100 and of the male coupling 200 (FIG. 7), thus envisages that the male connection is released thus allowing the forward translation of the inner assembly 102 with respect to the outer assembly 101 (under the forward bias of the double-acting spring 8) to go back to its starting position (note the balls 100sf positioned outside the groove 100 go again); at this point, the female coupling 100 and the male coupling 200 are reciprocally connected mechanically by virtue of the action of the connecting balls 100sf.

Furthermore, during the forward translation of the inner assembly 102 both the female valve assembly (the valve 108 and the valve guide 107) and the locking means 105 (the metal ring 104 and the arms 103) are fed forwards, so that the front ends 123 of the arms 103 remain in the releasing position, in particular along the shank 107c, forwards with respect to the surface 107ac of the shank 107c).

The final step of connecting of the male coupling 200 and of the female coupling 100 (FIG. 8) envisages that the fluid is pressurized in the circuit upstream of the coupling 100, and thus in the female coupling itself 100. In this manner, since the inner assembly 102 is in its all forward end of travel position, the thrust due to the increase of pressure causes a forward translation of the valve body 106 and consequently, since the thrust is greater than the resistance exerted by the spring 200m, and therefore the opening of the male valve 208 (the surface 208r detaches from the surface 200r thus opening the conduit and allowing the passage of fluid towards the male coupling 200).

Figure 8:
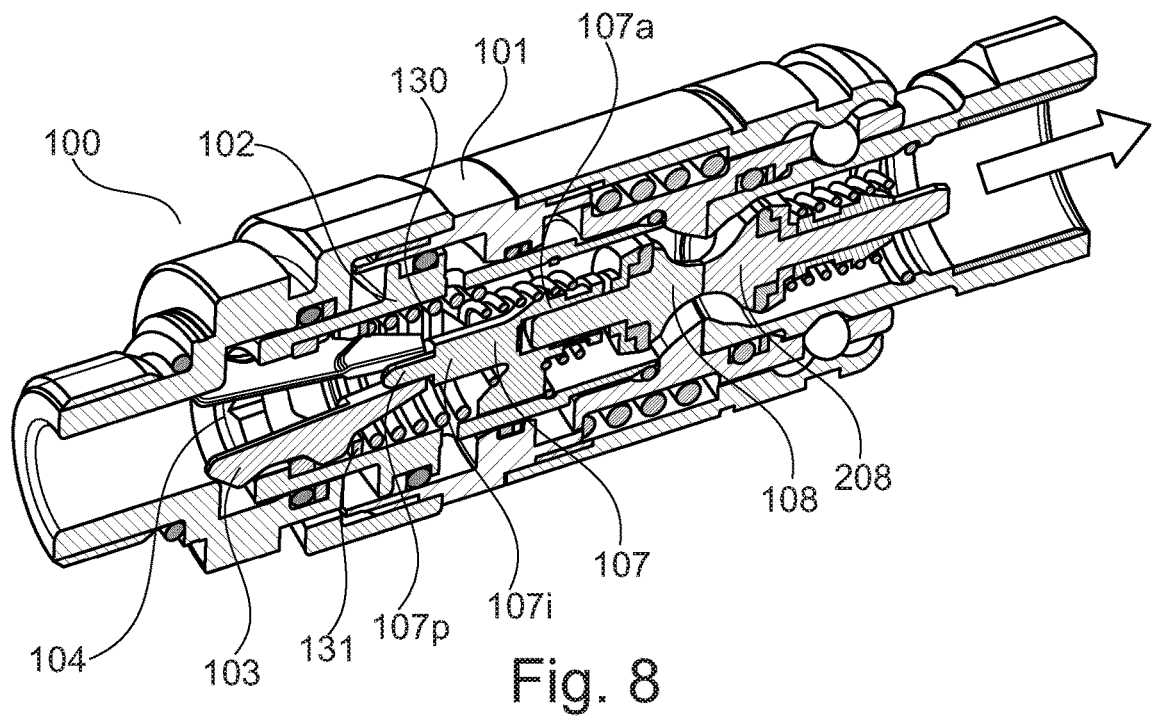
FIG. 8 shows a perspective and partial section view of a female coupling according to an embodiment of the present invention and of a male coupling in the final position of reciprocal connection.

During this step, the valve 108 reaches an intermediate still opening position, while the valve guide 107 "follows" the valve 108 under the forward bias of the double-acting helical spring (interposed between the locking means 105 and the valve guide 107) to reach the forward end of travel position shown in FIG. 8.

In particular, FIG. 8 shows how in the situation depicted therein (reciprocal coupling of a female coupling 100 and a male coupling 200 from both the hydraulic point of view, since both the female valve 108 and the male valve 208 are open, and the mechanical point of view), the surface 107ac of the valve guide 107 is positioned again at (at the height of) the front ends 123 of the pivoting arms 123 (which are stationary since the inner assembly 102 has already reached its forward end of travel position).

At this point, the backward thrust exerted by the spring 130 on the ring-shaped spacer 131 (the spacer 131, as the spring 130, being positioned between the arms 103 and the valve guide 107, and having the valve guide 107 already reached the forward end of travel position) translates into a backward thrust exerted by the spacer 130 on the inclined surfaces 126 of the arms 103, which are thus switched again to the engaging position; in particular, under the bias of the spacer 130, the front ends 123 of the arms 103 are switched towards the inside of the assembly 102, while the rear ends 122 of the arms 103 are switched towards the inner surface of the assembly 102, wherein the surfaces 124 of the arms 103 engage the surface 107ac of the valve guide 107 again, thus preventing any further backward translation. Indeed, an eventual backward translation of the female valve assembly 106 from the opening portion in FIG. 8 would be possible only by releasing the valve guide 107 from the pivoting arms 103, which however can be disengaged only by translating the inner hollow assembly 102 backwards. The valve guide 107 and the valve 108 are thus reliably locked in the opening position, so that any fluid flow interruption between the female coupling 100 and the male coupling 200 is prevented. It has in fact be explained above how hydraulic connection interruptions may occur in the quick connectors according to the prior art, e.g. in the case of fluid flow inversion.

So, we will assume a fluid flow inversion in the configuration in FIG. 8 for the sake of explanation, i.e. that the pressurized fluid starts flowing from the male coupling 200 into the female coupling 100 with consequent thrust on the female valve assembly 106 towards the inside of the coupling 100 (from the right leftwards in FIG. 8). Said thrust would however remain without any effect due to the locking means 105, which prevent any backward displacement of the valve assembly 106, so that consequently the valve assembly 106 prevents any forward displacement of the male valve 208, and thus finally the closing of the male valve 208 and the interruption of the hydrodynamic connection between the male coupling 200 and the female coupling 100.

It has been thus demonstrated by means of the above detailed description of the embodiments of the present invention as depicted in the drawings given that the present invention allows to achieve the predetermined objects by overcoming the drawbacks found in the prior art.

In particular, the present invention allows to manufacture a mechanical locking mechanism of the female valve assembly characterized by a low number of component parts and limited dimensions, which in particular can be installed on couplings of known type without increasing the overall dimension thereof.

The present invention also allows to provide a mechanical type mechanism and/or device for automatically locking the female valve assembly in opening position characterized by functional simplicity, and thus high reliability which is constant over time as well as limited wear.

The present invention also allows to manufacture and suggest a mechanism of the aforesaid type which can be made according to simple, standardizable manufacturing methods, and thus at low cost compatible with market needs.

Although the present invention is explained above by means of a detailed description of the embodiments depicted in the drawings the present invention is not limited to the embodiments described above and depicted in the drawings. Conversely, all the modifications and/or variants of the embodiments described above and shown in the drawings which will appear obvious and immediate to those skilled in the art fall within the scope of the present invention.

For example, both the conformation and the position and the fixing modes of the pivoting arms may be modified within the scope of the present invention.

The coupling according to the present invention is further adapted to be used in hydraulic circuits (with hydraulic oil as fluid) and in circuits for different fluids, e.g. pneumatic circuits.

The scope of the present invention is thus defined by the claims.

The invention claimed is:

1. A female coupling adapted to be connected to and disconnected from a corresponding male coupling by means of pushing and pulling actions, respectively, said female coupling and male coupling comprising a female valve assembly and a male valve assembly, respectively, each of said female and male valve assemblies being adapted to be alternatively translated forwards and backwards between a first closing position and a second opening position, wherein the flow of a fluid is possible between the female coupling and male coupling with said female and male valve assemblies in the respective opening positions, wherein said female coupling comprises mechanical locking means adapted to prevent the backward translation of the female valve assembly from its said second opening position, wherein said mechanical locking means comprise a rocker arm adapted to oscillate or pivot between a first engaging position and a second releasing position, wherein, said rocker arm, in its first engaging position, engages said female valve assembly, thus locking said female valve assembly in its second opening position so as to prevent the backward translation of said female valve assembly from its said second opening position, wherein said female coupling comprises a hollow main assembly, wherein said rocker arm is adapted to be translated with respect to said hollow main assembly between a first front position and second rear position, and wherein said rocker arm is adapted to be automatically switched from its engaging position to its second releasing position as the result of its translation from its first front position towards its second rear position.

2. The female coupling according to claim 1, wherein said female coupling further comprises a hollow inner assembly accommodated in said outer hollow main assembly and adapted to be alternatively translated forwards and backwards with respect to said outer hollow main assembly between a first front position and a second rear position, wherein said rocker arm is fixed to said hollow inner assembly so that said rocker arm is automatically switched from its first engaging position to its second releasing position as a result of the translation of said inner hollow assembly from its first front position to its second rear position.

3. The female coupling according to claim 2, wherein said mechanical locking means comprise a substantially ring-shaped intermediate element rigidly accommodated in said inner hollow assembly, and wherein said rocker arm is fixed to said intermediate ring-shaped element.

4. The female coupling according to claim 1, wherein said rocker arm comprises a first front end portion and a second rear end portion opposite to said first front end portion, wherein said main outer hollow body comprises an engaging surface, and wherein said second rear end portion of said rocker arm and said engaging surface are reciprocally positioned and configured so that during the translation of said rocker arm from its first front position to its second rear position, said rocker arm is automatically switched from its first engaging position to its second releasing position as a result of the reciprocal engagement or contrast between said second rear end portion of said rocker arm and said engaging or contrasting surface.

5. The female coupling according to claim 4, wherein said engaging surface is truncated-conical.

6. The female coupling according to claim 5, wherein said truncated-conical engaging surface is oriented so as to exert a thrust on said second rear end portion of said rocker arm so as to move away said second rear end portion of said rocker arm from the inner surface of said outer hollow main body during the translation of said rocker arm from its first front position towards its second rear position.

7. The female coupling according to claim 1, wherein said female coupling further comprises elastic means configured so as to automatically switch said rocker arm from its second releasing position to its first engaging position during the translation of said rocker arm from its second rear position towards its first front position.

8. The female coupling according to claim 7, wherein said elastic means comprise a helical spring interposed between said rocker arm and said female valve assembly.

9. The female coupling according to claim 7, wherein said female coupling further comprises a ring-shaped spacer interposed between said elastic means and said rocker arm, and wherein said ring-shaped spacer and said rocker arm are shaped and reciprocally positioned so that during the translation of said rocker arm from its second rear position towards its first front position said ring-shaped spacer is pushed against said rocker arm and said rocker arm is switched from its second releasing position to its first engaging position.

10. The female coupling according to claim 9, wherein said rocker arm comprises an engaging or contrasting position, and wherein said ring-shaped spacer and said engaging or contrasting surface are configured and reciprocally positioned so that during the translation of said rocker arm from its rear position towards it first front position, said ring-shaped spacer is pushed against said engaging or contrasting surface and said rocker arm is switched from its second engaging position to its first releasing position.

11. The female coupling according to claim 10, wherein said rocker arm comprises a fixing pin by means of which said rocker arm is fixed to said inner hollow assembly, and wherein said engaging or contrasting surface of said rocker arm is positioned between said fixing pin and said first end portion of said rocker arm.

12. The female coupling according to claim 1, wherein said female valve assembly comprises a main valve body and a valve guide, and wherein said rocker arm, in its first engaging position, engages said female guide valve.

13. The female coupling according to claim 12, wherein said female valve body and said female guide valve are adapted to be translated alternatively forwards and backwards with respect to each other.

14. The quick connector which comprises a female coupling according to claim 1 and a male coupling adapted to be coupled to and uncoupled from said female coupling.

* * * * *